United States Patent
Österlund et al.

(10) Patent No.: US 12,190,112 B2
(45) Date of Patent: Jan. 7, 2025

(54) COOPERATIVE GARBAGE COLLECTION BARRIER ELISION

(71) Applicant: Oracle International Corporation, Redwood Shores, CA (US)

(72) Inventors: Erik Österlund, Västerhaninge (SE); Nils Erik Eliasson, Johanneshov (SE)

(73) Assignee: Oracle International Corporation, Redwood Shores, CA (US)

( * ) Notice: Subject to any disclaimer, the term of this patent is extended or adjusted under 35 U.S.C. 154(b) by 316 days.

(21) Appl. No.: 17/582,430

(22) Filed: Jan. 24, 2022

(65) Prior Publication Data
US 2023/0236835 A1 Jul. 27, 2023

(51) Int. Cl.
G06F 12/02 (2006.01)
G06F 9/30 (2018.01)
G06F 9/32 (2018.01)
G06F 9/38 (2018.01)
G06F 9/455 (2018.01)
(Continued)

(52) U.S. Cl.
CPC ...... *G06F 9/30043* (2013.01); *G06F 9/30047* (2013.01); *G06F 9/3009* (2013.01); *G06F 9/321* (2013.01); *G06F 9/3834* (2013.01); *G06F 9/45516* (2013.01); *G06F 9/461* (2013.01); *G06F 9/522* (2013.01); *G06F 12/0253* (2013.01)

(58) Field of Classification Search
CPC ............. G06F 9/30043; G06F 9/30047; G06F 9/3009; G06F 9/321; G06F 9/3834; G06F 9/45516; G06F 9/461; G06F 9/522; G06F 12/0253

USPC .......................................................... 718/107
See application file for complete search history.

(56) References Cited

U.S. PATENT DOCUMENTS

| | | | |
|---|---|---|---|
| 5,765,007 A | 6/1998 | Rahman et al. | |
| 5,787,430 A | 7/1998 | Doeringer et al. | |
| 5,842,016 A | 11/1998 | Toutonghi et al. | |

(Continued)

FOREIGN PATENT DOCUMENTS

| | | | | |
|---|---|---|---|---|
| CA | 2700217 C | * | 7/2011 | ......... G06F 12/0269 |
| JP | 4265610 B2 | | 5/2009 | |

(Continued)

OTHER PUBLICATIONS

Vechev et al. "Write Barrier Elision for Concurrent Garbage Collectors", 2004 (Year: 2004).*

(Continued)

*Primary Examiner* — Bradley A Teets
(74) *Attorney, Agent, or Firm* — Invoke

(57) ABSTRACT

Techniques are disclosed for eliding load and store barriers while maintaining garbage collection invariants. Embodiments described herein include techniques for identifying an instruction, such as a safepoint poll, that checks whether to pause a thread between execution of a dominant and dominated access to the same data field. If a poll instruction is identified between the two data accesses, then a pointer for the data field may be recorded in an entry associated with the poll instruction. When the thread is paused to execute a garbage collection operation, the recorded information may be used to update values associated with the data field in memory such that the dominated access may be executed without any load or store barriers.

20 Claims, 6 Drawing Sheets

(51) Int. Cl.
  *G06F 9/46* (2006.01)
  *G06F 9/52* (2006.01)

(56) References Cited

U.S. PATENT DOCUMENTS

| | | | |
|---|---|---|---|
| 5,873,104 | A | 2/1999 | Tremblay et al. |
| 5,928,357 | A | 7/1999 | Underwood et al. |
| 5,933,840 | A | 8/1999 | Menon et al. |
| 6,052,699 | A | 4/2000 | Huelsbergen et al. |
| 6,065,020 | A | 5/2000 | Dussud |
| 6,158,024 | A | 12/2000 | Mandal |
| 6,226,653 | B1 | 5/2001 | Alpern et al. |
| 6,304,949 | B1 | 10/2001 | Houlsdworth |
| 6,324,637 | B1 | 11/2001 | Hamilton |
| 6,499,032 | B1 | 12/2002 | Tikkanen et al. |
| 6,567,905 | B2 | 5/2003 | Otis |
| 6,694,346 | B1 | 2/2004 | Aman et al. |
| 6,728,732 | B1 | 4/2004 | Eatherton et al. |
| 6,766,513 | B2 | 7/2004 | Charnell et al. |
| 6,769,004 | B2 | 7/2004 | Barrett |
| 6,809,792 | B1 | 10/2004 | Tehranchi et al. |
| 6,915,296 | B2 | 7/2005 | Parson |
| 7,072,905 | B2 | 7/2006 | Garthwaite |
| 7,089,272 | B1 | 8/2006 | Garthwaite et al. |
| 7,269,705 | B1 | 9/2007 | Seidl et al. |
| 7,293,051 | B1 | 11/2007 | Printezis et al. |
| 7,389,395 | B1 | 6/2008 | Garthwaite et al. |
| 7,404,182 | B1* | 7/2008 | Garthwaite ......... G06F 12/0269 717/140 |
| 7,523,081 | B1 | 4/2009 | Engebretsen |
| 7,539,837 | B1 | 5/2009 | Flood et al. |
| 7,546,587 | B2 | 6/2009 | Marr et al. |
| 7,548,940 | B2 | 6/2009 | Bacon et al. |
| 7,774,389 | B2 | 8/2010 | Stephens et al. |
| 7,808,929 | B2 | 10/2010 | Wong et al. |
| 7,904,493 | B2 | 3/2011 | Schmelter et al. |
| 7,962,707 | B2 | 6/2011 | Kaakani et al. |
| 8,051,426 | B2 | 11/2011 | Meijer et al. |
| 8,261,269 | B2 | 9/2012 | Garmark |
| 8,495,093 | B2 | 7/2013 | Baudel |
| 8,688,754 | B1 | 4/2014 | Burka et al. |
| 8,788,778 | B1 | 7/2014 | Boyle |
| 8,825,719 | B2 | 9/2014 | Steensgaard et al. |
| 8,825,721 | B2 | 9/2014 | Hunt et al. |
| 8,856,186 | B1 | 10/2014 | Li et al. |
| 9,135,169 | B2 | 9/2015 | Kawachiya et al. |
| 9,208,081 | B1 | 12/2015 | Dice et al. |
| 9,323,608 | B2 | 4/2016 | Troia |
| 9,503,435 | B2 | 11/2016 | Mizrahi et al. |
| 9,727,456 | B2 | 8/2017 | Malwankar et al. |
| 9,740,716 | B2 | 8/2017 | Wilhelmsson |
| 9,971,683 | B1 | 5/2018 | Bell et al. |
| 10,002,074 | B2 | 6/2018 | Flood et al. |
| 10,261,898 | B1 | 4/2019 | Payer |
| 10,664,391 | B2 | 5/2020 | Jang |
| 10,795,812 | B1 | 10/2020 | Duggal et al. |
| 10,929,288 | B1 | 2/2021 | Moore et al. |
| 10,983,908 | B1 | 4/2021 | Zou et al. |
| 10,996,884 | B2 | 5/2021 | Danilov et al. |
| 11,366,801 | B1 | 6/2022 | Kumar et al. |
| 11,507,503 | B1 | 11/2022 | Sterlund et al. |
| 11,573,894 | B2 | 2/2023 | Österlund et al. |
| 2002/0059520 | A1 | 5/2002 | Murakami et al. |
| 2003/0005027 | A1 | 1/2003 | Borman et al. |
| 2003/0188141 | A1 | 10/2003 | Chaudhry et al. |
| 2004/0186863 | A1* | 9/2004 | Garthwaite ......... G06F 12/0276 711/E12.012 |
| 2004/0187102 | A1 | 9/2004 | Garthwaite |
| 2005/0066329 | A1 | 3/2005 | Fischer et al. |
| 2005/0081190 | A1 | 4/2005 | Betancourt et al. |
| 2005/0102670 | A1 | 5/2005 | Bretl et al. |
| 2005/0114844 | A1 | 5/2005 | Betancourt et al. |
| 2005/0149686 | A1 | 7/2005 | Bacon et al. |
| 2005/0160416 | A1 | 7/2005 | Jamison |
| 2005/0188164 | A1 | 8/2005 | Ballantyne et al. |
| 2005/0235006 | A1 | 10/2005 | Adl-Tabatabai et al. |
| 2005/0267996 | A1 | 12/2005 | O'Connor et al. |
| 2006/0005171 | A1 | 1/2006 | Ellison |
| 2006/0026379 | A1 | 2/2006 | Jung |
| 2006/0143168 | A1 | 6/2006 | Rossmann |
| 2006/0143395 | A1 | 6/2006 | Zohar et al. |
| 2007/0016633 | A1 | 1/2007 | Lindholm et al. |
| 2007/0022149 | A1 | 1/2007 | Bacon et al. |
| 2007/0162528 | A1 | 7/2007 | Wright et al. |
| 2007/0234005 | A1 | 10/2007 | Erlingsson et al. |
| 2008/0034175 | A1 | 2/2008 | Traister et al. |
| 2008/0086619 | A1 | 4/2008 | Traister et al. |
| 2008/0140737 | A1 | 6/2008 | Garst et al. |
| 2008/0162787 | A1 | 7/2008 | Tomlin et al. |
| 2009/0007075 | A1 | 1/2009 | Edmark et al. |
| 2009/0037660 | A1 | 2/2009 | Fairhurst |
| 2009/0119352 | A1 | 5/2009 | Branda et al. |
| 2009/0132622 | A1 | 5/2009 | Rossmann et al. |
| 2009/0158288 | A1 | 6/2009 | Fulton et al. |
| 2009/0307292 | A1 | 12/2009 | Li et al. |
| 2009/0319720 | A1 | 12/2009 | Stefanus et al. |
| 2009/0328007 | A1 | 12/2009 | Chen et al. |
| 2010/0011357 | A1 | 1/2010 | Ramamurthy |
| 2010/0082710 | A1 | 4/2010 | Kilner et al. |
| 2010/0114998 | A1 | 5/2010 | Steensgaard et al. |
| 2010/0254254 | A1 | 10/2010 | Chan et al. |
| 2010/0287350 | A1 | 11/2010 | Ylonen |
| 2011/0145637 | A1* | 6/2011 | Gray ................. G06F 12/0815 711/E12.001 |
| 2011/0208792 | A1 | 8/2011 | Printezis et al. |
| 2011/0286420 | A1 | 11/2011 | Cho et al. |
| 2012/0203804 | A1 | 8/2012 | Burka et al. |
| 2013/0054925 | A1 | 2/2013 | Hsia |
| 2013/0073821 | A1 | 3/2013 | Flynn et al. |
| 2013/0138703 | A1 | 5/2013 | Daynes et al. |
| 2013/0227236 | A1 | 8/2013 | Flynn et al. |
| 2013/0290648 | A1 | 10/2013 | Shao et al. |
| 2013/0318132 | A1 | 11/2013 | Basu et al. |
| 2013/0332909 | A1 | 12/2013 | Odaira et al. |
| 2014/0032922 | A1 | 1/2014 | Spilman |
| 2014/0033213 | A1 | 1/2014 | Hudson et al. |
| 2014/0101372 | A1 | 4/2014 | Jung et al. |
| 2014/0108817 | A1 | 4/2014 | Chen et al. |
| 2014/0195818 | A1 | 7/2014 | Neumann et al. |
| 2014/0278447 | A1 | 9/2014 | Unoki et al. |
| 2014/0310235 | A1 | 10/2014 | Chan et al. |
| 2014/0359201 | A1 | 12/2014 | Chakrabarti |
| 2015/0006843 | A1 | 1/2015 | Moser |
| 2015/0026167 | A1 | 1/2015 | Neels et al. |
| 2015/0058381 | A1 | 2/2015 | Wilhelmsson |
| 2015/0081996 | A1 | 3/2015 | Flood |
| 2015/0100752 | A1 | 4/2015 | Flood |
| 2015/0227416 | A1 | 8/2015 | Reinart |
| 2015/0365941 | A1 | 12/2015 | Liu et al. |
| 2015/0378870 | A1 | 12/2015 | Marron et al. |
| 2016/0012280 | A1 | 1/2016 | Ito et al. |
| 2016/0042015 | A1 | 2/2016 | Landau et al. |
| 2016/0124802 | A1 | 5/2016 | Gabor et al. |
| 2016/0163381 | A1 | 6/2016 | Lee |
| 2016/0170649 | A1 | 6/2016 | Ramesh et al. |
| 2016/0179580 | A1 | 6/2016 | Benedict |
| 2016/0239413 | A1 | 8/2016 | Stephens et al. |
| 2016/0283369 | A1 | 9/2016 | Hada |
| 2016/0350214 | A1 | 12/2016 | Payer et al. |
| 2017/0006135 | A1 | 1/2017 | Siebel et al. |
| 2017/0039242 | A1 | 2/2017 | Milton et al. |
| 2017/0177168 | A1 | 6/2017 | Abudib et al. |
| 2017/0177471 | A1 | 6/2017 | Frazier et al. |
| 2017/0262364 | A1 | 9/2017 | Liden et al. |
| 2017/0344473 | A1 | 11/2017 | Gidra et al. |
| 2018/0074854 | A1 | 3/2018 | Chan |
| 2018/0173728 | A1 | 6/2018 | Munakata |
| 2018/0276120 | A1 | 9/2018 | Vytiniotis et al. |
| 2018/0335968 | A1 | 11/2018 | Pauley et al. |
| 2018/0365106 | A1 | 12/2018 | Huang et al. |
| 2019/0042406 | A1 | 2/2019 | Guniguntala et al. |
| 2019/0042440 | A1 | 2/2019 | Kumar et al. |
| 2020/0012600 | A1 | 1/2020 | Konoth et al. |
| 2020/0012647 | A1 | 1/2020 | Johnson et al. |

(56) References Cited

U.S. PATENT DOCUMENTS

| | | |
|---|---|---|
| 2020/0026781 A1 | 1/2020 | Khot et al. |
| 2020/0081748 A1 | 3/2020 | Johnson et al. |
| 2020/0125364 A1 | 4/2020 | Erik |
| 2020/0202127 A1 | 6/2020 | Chen et al. |
| 2020/0250084 A1 | 8/2020 | Stephens et al. |
| 2020/0310963 A1 | 10/2020 | Nilsen |
| 2020/0327052 A1* | 10/2020 | Nilsen ................ G06F 12/0269 |
| 2020/0379902 A1 | 12/2020 | Durham et al. |
| 2021/0124608 A1 | 4/2021 | Shveidel et al. |
| 2021/0278990 A1 | 9/2021 | Choi |
| 2022/0058732 A1 | 2/2022 | Reses |
| 2022/0138098 A1 | 5/2022 | Osterlund et al. |
| 2022/0188432 A1 | 6/2022 | Turmel et al. |

FOREIGN PATENT DOCUMENTS

| | | |
|---|---|---|
| WO | 00/29937 A2 | 5/2000 |
| WO | 2016/073019 A1 | 5/2016 |
| WO | 2017/053754 A1 | 3/2017 |
| WO | 2017/178114 A9 | 12/2017 |

OTHER PUBLICATIONS

Harris T, et al., "Dynamic filtering: multi-purpose architecture support for language runtime systems," ACM SIGARCH Computer Architecture News, vol. 38, Issue 1, Mar. 2010, pp. 39-52.

Rogers I., "Reducing and eliding read barriers for concurrent garbage collectors," ICOOOLPS '11: Proceedings of the 6th Workshop on Implementation, Compilation, Optimization of Object-Oriented Languages, Programs and Systems, Jul. 2011, Article No. 5, pp. 1-5.

Title: Understanding memory allocation of Scheme programs author: M Serrano published on 2000.

Verma A., "The comprehensive guide to react's virtual DOM", May 15, 2021, pp. 23.

Wilson, P.R., et al., "A "Card-making" scheme for controlling intergenerational differences in generation-based garbage collection on stock hardware," ACM SIGPLAN Notices, vol. 24, Issue 5, May 1989, pp. 87-92.

Write Barrier Elision for Concurrent Garbage Collectors by Vechev (Year: 2004).

Yang et al., "Deep Dive into ZGC: A Modern Garbage Collector in OpenJDK", ACM Transactions on Programming Language and Systems, ACM, New York, NY, 2022, vol. 44, No. 4, 34 Pages.

Yang et al., "Improving Program Locality in the GC using Hotness," PLDI' 20, pp. 301-313, Jun. 15-20, 2020.

Yuasa et al., "Return Barrier", International Lisp Conference, 2002, pp. 1-12 (Year: 2002).

Yuasa et al., "Return Barrier," International Lisp Conference, 2002, 12 pages.

Yuasa, T., "Real-time garbage collection on general-purpose machines," Journal of Systems and Software, vol. 11, Issue 3, Mar. 1990, pp. 181-198.

ZGC Concurrent Class Unloading—Another Safepoint Operation Bites the Dust: available online at //cr.openjdk.java.net/~pliden/slides/ZGC-Jfokus-2019.pdf>, Feb. 4, 2019, 55 pages.

Zhao et al., "Low-latency, high-throughput garbage collection", PLDI 2022: Proceedings of the 43rd ACM SIGPLAN International Conference on Programming Language Design and Implementation, Jun. 2022, pp. 76-91.

"Basic Graph Algorithms", Indian Computing Olympiad, Retrieved from //www.iarcs.org.in/inoi/online-study-material/topics/graphs-dfs.php, Retrieved on Dec. 8, 2022, pp. 3.

"Lazy Compaction", Retrieved from //wiki.se.oracle.com/display/JPG/Lazy+Compaction, Retrieved on Sep. 20, 2022, 2 Pages.

"React as UI runtime", Overreacted, Feb. 2, 2019, pp. 38.

"Recitation 8—Dijkstra's Algorithm and DFS Numberings", Parallel and Sequential Data Structures and Algorithms, 15-210 (Fall 2013), Oct. 16, 2013, pp. 1-6.

"What is Schema?" Retrieved from //github.com/json-schema-org/understanding-json-schema, Jan. 11, 2023, pp. 3.

"ZGC—Generations Revision 2," accessed at //wiki.se.oracle.com/display/JPG/ZGC+-+Generations+Revision , Feb. 1, 2020, pp. 6.

A concurrent, generational garbage collector for a multithreaded implementation of ML by Doligez (Year: 1993).

A Hardware Accelerator for Tracing Garbage Collection by Maas (Year: 2018).

Armbrust Michael Michael@Databricks Com et al, "Spark SQL Relational Data Processing in Spark," Proceedings of The 2015 ACM SIGMOD International Conference on Management of Data, SIGMOD '15, ACM Press, New York, New York, USA, May 27, 2015, pp. 1383-1394.

Benjamin Zorn, Barrier Methods for Garbage Collection, Nov. 1990, UC Boulder available at: //spl.cde.state.co.us/artemis/ucbserials/ucb51110internet/1990/ucb51110494internet.pdf (Year: 1990).

Boehm et al.; "Efficient In-Memory Indexing with Generalized Prefix Trees", downloaded from //pdfs.Semanticscholar.org/c5ca/a359fe6b345580a4dd476d5dd41 a90bf301c.pdf; Mar. 26, 2018.

Click et al.; "The Pauseless GC Algorithm", VEE 05, Jun. 11-12, 2005, Chicago, Illinois, USA. Copyright 2005 ACM 1-59593-047-7/05/0006 . . . S5.00.

Clifford et al., "Memento Mori: Dynamic Allocation-Site-Based Optimizations", ACM SIGPLAN Notices, vol. 50, No. 11, Jun. 14, 2015, pp. 105-117.

David Gnedt, "Fast Profiling in the HotSpot Java VM with Incremental Stack Tracing and Partial Safepoints," Faculty of Engineering and Natural Sciences, 2014, 57 pages.

Detlefs; "Concurrent Remembered Set Refinement in Generational Garbage Collection", Proceedings of the USENIX Java VM '02 Conference, Aug. 1-2, 2002, San Francisco, CA.

Domani et al., "Implementing an On-the-fly Garbage Collector for Java," ACM SIGPLAN Notices, vol. 36, No. 1, 2000, pp. 155-166.

Dorai et al., Control delimiters and their hierarchies, LISP and Symbolic Computation: An International Journal, vol. 3, 1990, pp. 67-99.

Ellis D., "What is Swagger? A beginner's guide", Jul. 26, 2022, pp. 6.

Feng et al.; "Trie-join: a trie-based method for efficient string similarity joins", Published online Oct. 4, 2011; The VLDB Journal Springer-Verlag 2011.

Fitzgerald; "The Case for Profile Directed Selection of Garbage Collectors", Proceedings of the 2nd International Symposium on Memory Management, ACM, New York, NY USA, 111-120, DOI= 10.1145/362422.362472, doi.acm.org/10.1145/362422.362472.

Generational Garbage Collection, Write Barriers/Write Protection and userfaultfd(2) by Cracauer (Year: 2016).

Getting started with Z Garbage Collector(ZGC) in Java 11 [Tutorial] by Davis (Year: 2019).

Goetz, Java theory and practice Garbage collection in the HotSpot JVM, Generational and concurrent garbage collection, IBM Developer Works, Nov. 25, 2003.

Heule et al., "HyperLogLog in practice: algorithmic engineering of a state of the art cardinality estimation algorithm," EDBT '13: Proceedings of the 16th International Conference on Extending Database Technology, Mar. 2013, pp. 683-692.

Hosking; "A Comparative Performance Evaluation of Write Barrier Implementations", Proceedings ACM Conference on Object-Oriented Programming Systems, Languages and Applications, Vancouver, Canada, Oct. 1992, pp. 92-109.

How to Implement Java's hashCode Correctly, May 19, 2016, Available online at sitepoint.com/how-to-implement-javas-hashcode-correctly/>, 7 pages.

JDK 15, Available online at //openjdk.java.net/projects/jdk/15/ >, Last updated, Sep. 15, 2020, 2 pages.

JEP 333: ZGC: A Scalable Low-Latency Garbage Collector(Experimental) by Liden and Karlsson (Year: 2020).

Joisha; "Sticky Tries: Fast Insertions, Fast Lookups, No Deletions for Large Key Universe", ISMM '14, Jun. 12, 2014, Edinburgh UK.

Kliot et al., "A Lock-Free, Concurrent, and Incremental Stack Scanning for Garbage Collectors," In Proceedings of the ACM SIGPLAN/SIGOPS International Conference on Virtual Execution Environments (VEE '09), 2009, pp. 11-20.

(56) References Cited

OTHER PUBLICATIONS

Lokesh Gupta, "Java Secure Hashing—MD5, SHA256, SHA512, PBKDF2, BCrypt, Scrypt," Available online at //howtodoinjava.com/security/how-to-generate-secure-password-hash-md5-sha-pbkdf2-bcrypt-examples/> printed on Apr. 14, 2020, 38 pages.

M. Felleisen et al., Beyond Continuations: Technical Report No. 216, Feb. 1987, 13 pages.

Main—Main—OpenJDK Wiki, Created by Iris Clark, last modified by Per Liden, available online at <URL: //wiki.openjdk.java.net/display/zgc/Main>, Oct. 15, 2020, 9 pages.

Mohamed A. El-Zawawy, "Recognition of Logically Related Regions Based Heap Abstraction", Journal of the Egyptian Mathematical Society, vol. 20, Issue 2, Jul. 2012, pp. 64-71, arXiv:1212.5094 [cs.LO].

Mostly Concurrent Garbage Collection Revisited by Barabash (Year: 2003).

Olsson et al.; "Trash a dynamic LC-trie and hash data structure", Trita-CSC-TCS 2006:2, ISRN/KTH/CSC/TCS-2006/2-SE, ISSN 1653-7092, Aug. 18, 2006.

Open JDK, "HotSpot Glossary of Terms", 2006, Sun Microsystems, available at openjdk.java.net/groups/hotspot/docs/HotSpotGlossary.html>, 6 pages.

Osterlund E., "Garbage Collection supporting automatic JIT parallelization in JVM", Computer Science, Jun. 26, 2012, pp. 29.

Osterlund E., "Going Beyond On-The-Fly Garbage Collection and Improving Self-Adaptation with Enhanced Interfaces", Computer Science, 2019, pp. 68.

Osterlund et al., "Block-Free Concurrent GC: Stack Scanning and Copying," International Symposium on Memory Management, vol. 51, 2016, 12 pages.

Per Liden, The Design of ZGC—A scalable Low-Latency Garbage Collector for Java: available online at cr.openjdk.java.net/~pliden/slides/ZGC-PLMeetup-2019.pdf>, Jun. 12, 2019, 84 pages.

Pufek et al., "Analysis of Garbage Collection Algorithms and Memory Management in Java", 2019 42nd International Convention on Information and Communication Technology, Electronics and Microelectronics (MIPRO), Croatian Society MIPRO, May 20, 2019, pp. 1677-1682.

Robbin Ehn, "JEP 312: Thread-Local Handshakes," Hotspot Dash Dev at Openjdk Dot Java Dot Net, available at openjdk.java.net/jeps/312>, 2018, 3 pages.

Ryan Sciampacone et al, "Garbage collection in WebSphere Application Server V8, Part 2: Balanced garbage collection as a new option", IBM developerWorks, Aug. 3, 2011.

Saxena et al., "Key and Value Paired Data using Java Hash Table," International Journal of Engineering and Management Research, vol. 4, Issue 1, Feb. 2014, pp. 81-89.

Stefan Karlsson, JEP 439: Generational ZGC, Aug. 25, 2021, OpenJDK, available at: openjdk.org/jeps/439 (Year: 2021).

Tene et al.; C4: The Continuously Concurrent Compacting Collector ISMM'11, Jun. 4-5, 2011, San Jose, CA, USA Copyright 2011, ACM 978-M503-0263-0/11/06 . . . $10.00.

The Z Garbage Collector—Low Latency GC OpenJDK, available online at //cr.openjdk.java.net/~pliden/slides/ZGC-Jfokus-2018.pdf>, 2018, 96 pages.

Title: Detecting and eliminating memory leaks using cyclic memory allocation, author: JJ Nguyen et al., published on 2007.

Title: Reconsidering custom memory allocation; author:: ED Berger et al., published on 2002.

\* cited by examiner

COOPERATIVE GARBAGE COLLECTION BARRIER ELISION

TECHNICAL FIELD

The present disclosure relates to techniques for optimizing automatic memory management operations. In particular, the present disclosure relates to techniques for eliding garbage collection (GC) barriers while maintaining GC invariants.

BACKGROUND

Garbage collection (GC) is a set of techniques and processes for automatically managing memory to reclaim space that has been allocated to a program but is no longer needed. During memory management operations, read and write barriers may be injected into compiled code to maintain GC invariants and prevent data corruption in memory. For example, program threads, also referred to as mutators, may execute read barriers during object loads to check whether an object pointer points to a stale or up-to-date version of the object. If the object pointer points to a stale version of the object, then a read barrier may include additional operations to remap the pointer and properly resolve the object. Additionally or alternatively, mutators may execute write barriers to ensure pointers are properly maintained during store operations.

Executing GC barriers for every read or write operation is computationally expensive. Runtime performance for an application may be improved by eliding barriers and avoiding the extra costs incurred by executing the additional operations. However, improperly eliding a barrier raises the risk of breaking a GC invariant and corrupting data stored in memory.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
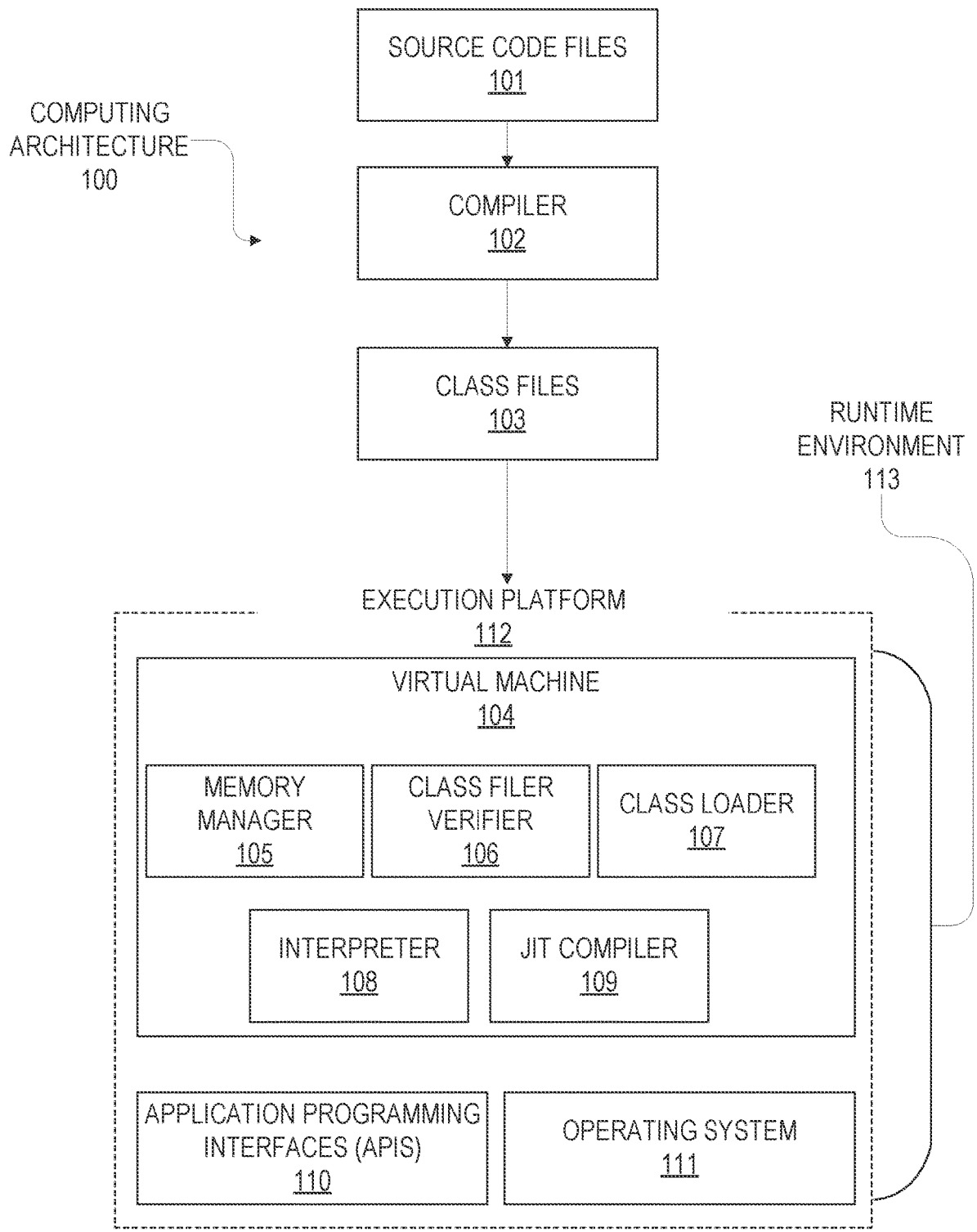
FIG. 1 illustrates an example computing architecture in which techniques described herein may be practiced.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. RUNTIME ENVIRONMENTS
    2.1 ARCHITECTURAL OVERVIEW
    2.2 EXAMPLE VIRTUAL MACHINE ARCHITECTURE
    2.3 SAFEPOINT POLLS AND EXECUTION
3. RECORDED ENTRIES FOR JIT-COMPILED CODE
4. SAFEPOINT-ATTACHED BARRIERS
5. HARDWARE OVERVIEW
6. MISCELLANEOUS; EXTENSIONS

1. General Overview

Techniques for cooperatively eliding GC barriers are described herein. Runtime environments may be configured to elide barriers when the environment determines that proceeding with a control flow path without executing a load or store barrier does not negatively impact GC operations. For example, GC barriers may be elided for an access that is dominated by another access to the same object field if there are no safepoint polls in between the two accesses. When a safepoint poll is not present, the runtime environment may safely infer that memory pointers associated with the dominating access remain valid for the subsequent access to the same object field. As a result, the control flow path may continue without injecting code to execute a load or store barrier.

Runtime environments may further optimize application performance by eliding barriers even when there are safepoint polls between a dominating access and a subsequent access to the same object field. A safepoint poll performs a check to determine whether a safepoint operation has been requested. Safepoint polls frequently do not result in the execution of a safepoint operation, in which case, the runtime environment may infer that the pointer associated with the dominating access remains valid for the subsequent access to the same object field. Thus, if the safepoint poll does not lead to execution of a safepoint operation, GC barriers may be elided in the same manner as if there were no safepoint poll between the dominating access and the subsequent access.

When a safepoint poll is present between two object accesses, eliding GC barriers is complicated by the inability of just-in-time (JIT) compilers to determine a priori whether the safepoint poll will trigger a safepoint execution. A safepoint execution may lead to a change in the phase of a garbage collector, in which case a subsequent access may no longer rely on the memory pointers for data objects resolved by a dominating access. The compiler may inject code to execute GC barriers whenever a safepoint poll is detected to account for the possibility, however small, that a safepoint execution is triggered. However, eliding these barriers allows for significantly more opportunities for optimization. Notably, loops often have safepoints with access to the same field in each iteration, and eliding such barriers inside of loops may significantly improve loop execution performance.

Embodiments described herein allow JIT compilers to elide GC barriers even when there are safepoint polls between accesses. To account for the possibility that a safepoint poll leads to the execution of a safepoint operation, the runtime environment may perform an analysis to determine where a safepoint operation may acquire the base pointer of an affected access. The runtime environment may then record a set of information, including the base pointer, to perform self-healing operations. By recording the set of information, a GC process may lazily and incrementally resolve different pointers associated with the same object field. The GC process may apply these barriers, referred to herein as safepoint-attached barriers, before control is returned to the JIT-compiled code from execution of the safepoint operation. The JIT-compiled code may continue safely, despite the JIT-compiled code itself having no GC barriers for the subsequent, dominated object access.

One or more embodiments described in this Specification and/or recited in the claims may not be included in this General Overview section.

2. Runtime Environments 2.1 Architectural Overview

In some embodiments, the techniques described herein for cooperative GC barrier elision are executed within a runtime environment. A runtime environment in this context may include supporting code, tools and/or other hardware/software components that implement a program's execution. One or more components of the runtime environment may vary depending on the programming language of the program's source code, the hardware platform on which the program is executed, the operating system version, and/or other system attributes.

FIG. 1 illustrates an example computing architecture in which techniques described herein may be practiced. Software and/or hardware components described with relation to the example architecture may be omitted or associated with a different set of functionality than described herein. Software and/or hardware components, not described herein, may be used within an environment in accordance with some embodiments. Accordingly, the example environment should not be constructed as limiting the scope of any of the claims.

As illustrated in FIG. 1, computing architecture 100 includes source code files 101 which are compiled by compiler 102 into blueprints representing the program to be executed. Examples of the blueprints include class files 103, which may be loaded and executed by execution platform 112. Execution platform 112 includes runtime environment 113, operating system 111, and one or more application programming interfaces (APIs) 110 that enable communication between runtime environment 113 and operating system 111. Runtime environment 113 includes virtual machine 104 comprising various components, such as memory manager 105 (which may include a garbage collector), class file verifier 106 to check the validity of class files 103, class loader 107 to locate and build in-memory representations of classes, interpreter 108 for executing virtual machine code, and JIT compiler 109 for producing optimized machine-level code.

In some embodiments, computing architecture 100 includes source code files 101 that contain code written in a particular programming language, such as Java, C, C++, C#, Ruby, Perl, and so forth. Thus, source code files 101 adhere to a particular set of syntactic and/or semantic rules for the associated language. For example, code written in Java adheres to the Java Language Specification. However, since specifications are updated and revised over time, source code files 101 may be associated with a version number indicating the revision of the specification to which source code files 101 adhere. One or more of source code files 101 may be written in a programming language supported by automatic garbage collection.

In various embodiments, compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by virtual machine 104 that is capable of running on top of a variety of particular machine environments. The virtual machine instructions are executable by virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which virtual machine 104 resides.

In some embodiments, virtual machine 104 includes interpreter 108 and JIT compiler 109 (or a component implementing aspects of both), and executes programs using a combination of interpreted and compiled techniques. For example, virtual machine 104 may initially begin by interpreting the virtual machine instructions representing the program via the interpreter 108 while tracking statistics related to program behavior, such as how often different sections or blocks of code are executed by virtual machine 104. Once a block of code surpass a threshold (is "hot"), virtual machine 104 may invoke JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In other embodiments, runtime environment 113 may not include a virtual machine. For example, some static and stack-based environments do not execute programs using a virtual machine. A runtime environment may include supporting code, tools and/or other hardware/software components that implement a given program's execution. One or more components of the runtime environment may vary depending on the programming language of the source code, the hardware platform on which the program is executed, and/or the operating system version.

Source code files 101 have been illustrated as the "top level" representation of the program to be executed by execution platform 111. Although computing architecture 100 depicts source code files 101 as a "top level" program representation, in other embodiments source code files 101 may be an intermediate representation received via a "higher level" compiler that processed code files in a different language into the language of source code files 101.

In some embodiments, compiler 102 receives as input the source code files 101 and converts the source code files 101 into class files 103 that are in a format expected by virtual machine 104. For example, in the context of the JVM, the Java Virtual Machine Specification defines a particular class file format to which class files 103 are expected to adhere. In some embodiments, class files 103 contain the virtual machine instructions that have been converted from source code files 101. However, in other embodiments, class files 103 may contain other structures as well, such as tables identifying constant values and/or metadata related to various structures (classes, fields, methods, and so forth).

2.2 Example Virtual Machine Architecture

Figure 2:
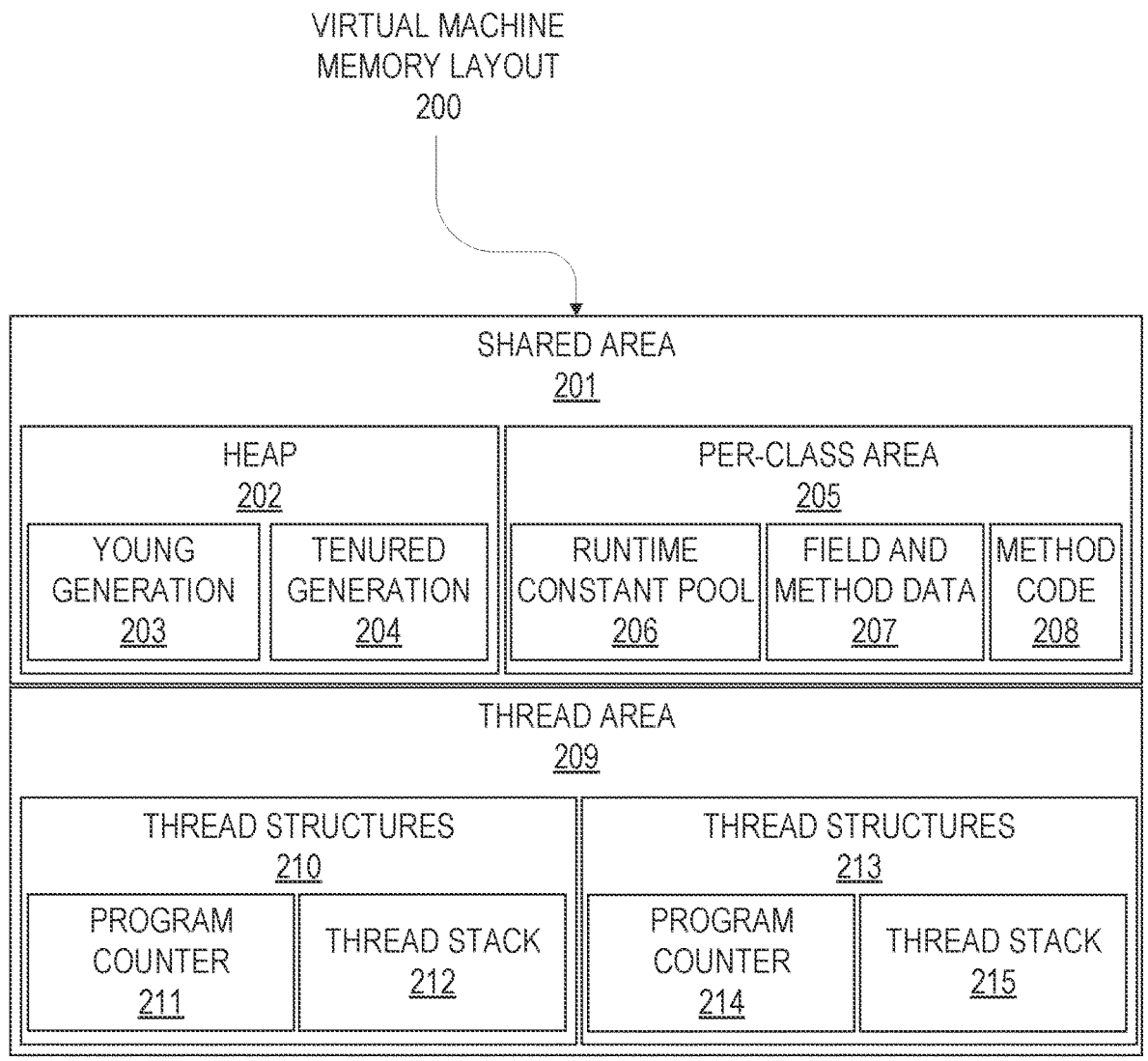
FIG. 2 illustrates an example virtual machine memory layout according to some embodiments.

FIG. 2 illustrates example virtual machine memory layout 200 according to some embodiments. Virtual machine 104 may adhere to the virtual machine memory layout 200 depicted in FIG. 2. In other embodiments, the memory layout of virtual machine 104 may vary, such as by including additional components and/or omitting one or more of the depicted components, depending on the runtime environment. Although components of the virtual machine memory layout 200 may be referred to as memory "areas", there is no requirement that the memory areas are physically contiguous.

In the example illustrated by FIG. 2, virtual machine memory layout 200 is divided into shared area 201 and thread area 209. Shared area 201 represents an area in memory where structures shared among the various threads executing on virtual machine 104 are stored. Shared area 201 includes heap 202 and per-class area 205.

Heap 202 represents an area of memory allocated on behalf of a program during execution of the program. In some embodiments, heap 202 includes young generation 203 and tenured generation 204. Young generation 203 may correspond to regions of the heap that stores newly created objects during program execution. When young generation 203 is filled, the oldest objects are promoted to tenured generation 204 to free up space for new objects in young generation 203. Promoting an object may comprise moving to a different region and/or reclassifying the data objects.

Separate treatment of different generations of objects may facilitate generational garbage collection. Generally, most objects have a short lifecycle during program execution. Thus, performing garbage collection more frequently on objects stored in young generation 203 may optimize the amount of space that may be reclaimed for a given scan. Although only two generations are depicted, in other embodiments, heap 202 may include other age-related generations, such as a permanent generation.

In some embodiments, young generation 203 stores newly created barriers, and the garbage collector does not restrict objects within this region of memory from being mutated. In contrast, GC barriers may be applied to tenured generation 204 to maintain the position of pointers within the data objects. GC barriers may also be applied to the young generation when the young generation is subject to fully concurrent garbage collection and does no significant work in safepoints. Garbage collectors may elide barriers in the young generation when the young generation is also analyzed inside of safepoints. Additionally or alternatively, GC barriers in young and tenured generations may be elided in certain scenarios to optimize performance as described further herein. In addition or as an alternative to young generation 203 and tenured generation 204, heap 202 may organize data objects into other memory areas in a manner that is not age-based. For example, data objects may be stored in different regions based on datatype, size, and/or other object attributes. Some regions that are not age-based may be subject to GC barriers while other regions may not be subject to GC barriers. Thus, the in-memory organization of data objects may vary depending on the implementation.

Per-class area 205 represents the memory area where the data pertaining to the individual classes are stored. In some embodiments, per-class area 205 includes, for each loaded class, run-time constant pool 206 representing data from a constant table of the class, field and method data 207 (for example, to hold the static fields of the class), and the method code 208 representing the virtual machine instructions for methods of the class.

Thread area 209 represents a memory area where structures specific to individual threads are stored. In FIG. 2, thread area 209 includes thread structures 210 and thread structures 213, representing the per-thread structures utilized by different threads. In order to provide clear examples, thread area 209 depicted in FIG. 2 assumes two threads are executing on the virtual machine 104. However, in a practical environment, virtual machine 104 may execute any arbitrary number of threads, with the number of thread structures scaled accordingly.

In some embodiments, thread structures 210 includes program counter 211 and thread stack 212. Similarly, thread structures 213 includes program counter 214 and thread stack 215.

In some embodiments, program counter 211 and program counter 214 store the current address of the virtual machine instruction being executed by their respective threads. Thus, as a thread steps through the instructions, the program counters are updated to maintain an index to the current instruction.

In some embodiments, thread stack 212 and thread stack 215 each store stack frames for their respective threads, where each stack frame holds local variables for a function. A frame is a data structure that may be used to store data and partial results, return values for methods, and/or perform dynamic linking. A new frame is created each time a method is invoked. A frame is destroyed when the method that caused the frame to be generated completes. Thus, when a thread performs a method invocation, virtual machine 104 generates a new frame and pushes the frame onto the virtual machine stack associated with the thread.

When a method invocation completes, virtual machine 104 passes back the result of the method invocation to the previous frame and pops the current frame off of the stack. In some embodiments, for a given thread, one frame is active at any point. This active frame is referred to as the current frame, the method that caused generation of the current frame is referred to as the current method, and the class to which the current method belongs is referred to as the current class.

Thread stack 212 and thread stack 215 may correspond to native operating system stacks or virtual thread stacks. Generally, the number of virtual threads executing on a machine is much greater than the number of native threads. Virtual threads may be built atop delimited continuations, which reify the program control state and switch are generally much lighter weight, require less compute-intensive operations, than native threads, as the continuations may leverage the native thread structures when mounted and executed. An example delimited continuation is a continuation stack, which stores a representation of an execution stack for a given thread of execution. Application runtime environments may mount and yield continuation stacks to switch between different tasks. When a continuation stack is mounted, the captured execution stack is loaded and executed. When the continuation stack is yielded, execution is suspended, and the current state of the execution stack is saved. Delimited continuations may be used for lightweight concurrent programming, allowing a runtime environment to run several more tasks in parallel than available physical processing cores.

Figure 3:
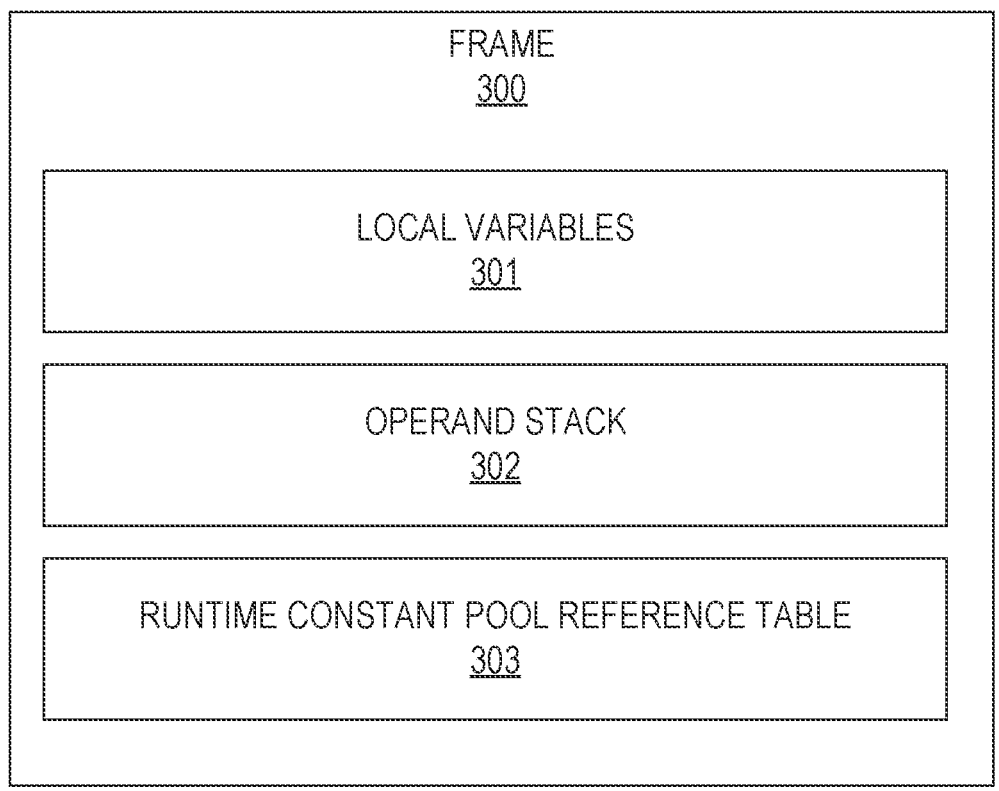
FIG. 3 illustrates an example frame layout according to some embodiments.

FIG. 3 illustrates an example frame layout according to some embodiments. In some embodiments, frames of a thread stack, such as thread stack 212 and thread stack 215 adhere to the structure of frame 300.

In some embodiments, frame 300 includes local variables 301, operand stack 302, and run-time constant pool reference table 303. In some embodiments, local variables 301 are represented as an array of variables that each hold a value, for example, boolean, byte, char, short, int, float, or reference. Further, some value types, such as longs or doubles, may be represented by more than one entry in the array. The local variables 301 are used to pass parameters on method invocations and store partial results. For example, when generating the frame 300 in response to invoking a method, the parameters may be stored in predefined positions within the local variables 301, such as indexes 1-N corresponding to the first to Nth parameters in the invocation. The parameters may include pointers and other references.

In some embodiments, the operand stack 302 is empty by default when the frame 300 is created by the virtual machine 104. The virtual machine 104 then supplies instructions from the method code 208 of the current method to load constants or values from the local variables 301 onto the operand stack 302. Other instructions take operands from the operand stack 302, operate on them, and push the result back onto the operand stack 302. Furthermore, the operand stack 302 is used to prepare parameters to be passed to methods and to receive method results. For example, the parameters of the method being invoked could be pushed onto the operand stack 302 prior to issuing the invocation to the method. The virtual machine 104 then generates a new frame for the method invocation where the operands on the operand stack 302 of the previous frame are popped and loaded into the local variables 301 of the new frame. When the invoked method terminates, the new frame is popped from the virtual machine stack and the return value is pushed onto the operand stack 302 of the previous frame.

In some embodiments, run-time constant pool reference table 303 contains a reference to the run-time constant pool of the current class (e.g., runtime constant pool 206). Run-time constant pool reference table 303 is used to support resolution. Resolution is the process whereby symbolic references in the constant pool are translated into concrete memory addresses. Resolution may include loading classes to resolve as-yet-undefined symbols and translating variable accesses into appropriate offsets into storage structures associated with the run-time location of these variables.

2.3 Safepoint Polls and Execution

In some embodiments, safepoint polls may be injected into JIT-compiled code, where a safepoint poll includes one or more instructions for checking whether execution of a safepoint operation has been requested. For example, a safepoint poll may include an intermediate representation instruction that checks a flag, which may be set when a safepoint execution has been requested. If the flag has been set, then execution of the thread may be temporarily paused to execute a safepoint operation. If the flag has not been set, then the thread may continue executing the program instructions without pausing to execute the safepoint operation. Other processes may set the flag when interruption of the thread is required to properly or safely perform another operation, such as a full garbage collection or a stack trace operation.

Safepoint polls may help coordinate cooperative execution in runtime environments with concurrent thread processing. For example, a process may set a flag to request a safepoint to perform a full garbage collection or a stack trace operation. Each thread may execute safepoint polls to determine whether to stop for a safepoint execution. The polling instructions may be injected at points in a program execution at which GC roots associated with a thread are reachable and heap object contents are consistent. After a safepoint request has been issued and the flag has been set, each thread may stop execution at the next safepoint poll. When all threads stop at these points, the virtual machine has reached a safepoint. Execution of a safepoint operation may thus result in a "stop-the-world" pause of a program, during which auxiliary processes, including GC processes and stack tracing, may be run.

3. Recorded Entries for JIT-Compiled Code

In some embodiments, JIT-compiler 109 (or another process within runtime environment 113) is configured to record information for executing safepoint-attached barriers when the safepoint poll is followed by a safepoint execution. If a safepoint exists between two accesses to the same field, then runtime environment 113 may infer that the base pointer is live in the safepoint. For example, runtime environment 113 may record a set of object reference map entries for the execution state to perform accurate moving garbage collection operation. In this scenario, one of the object reference map entries is the base pointer of the two accesses. By walking the use-definition chains from the dominated access back to the safepoint poll instruction, runtime environment 113 may determine which one of the entries corresponds to the base pointer.

Figure 4:
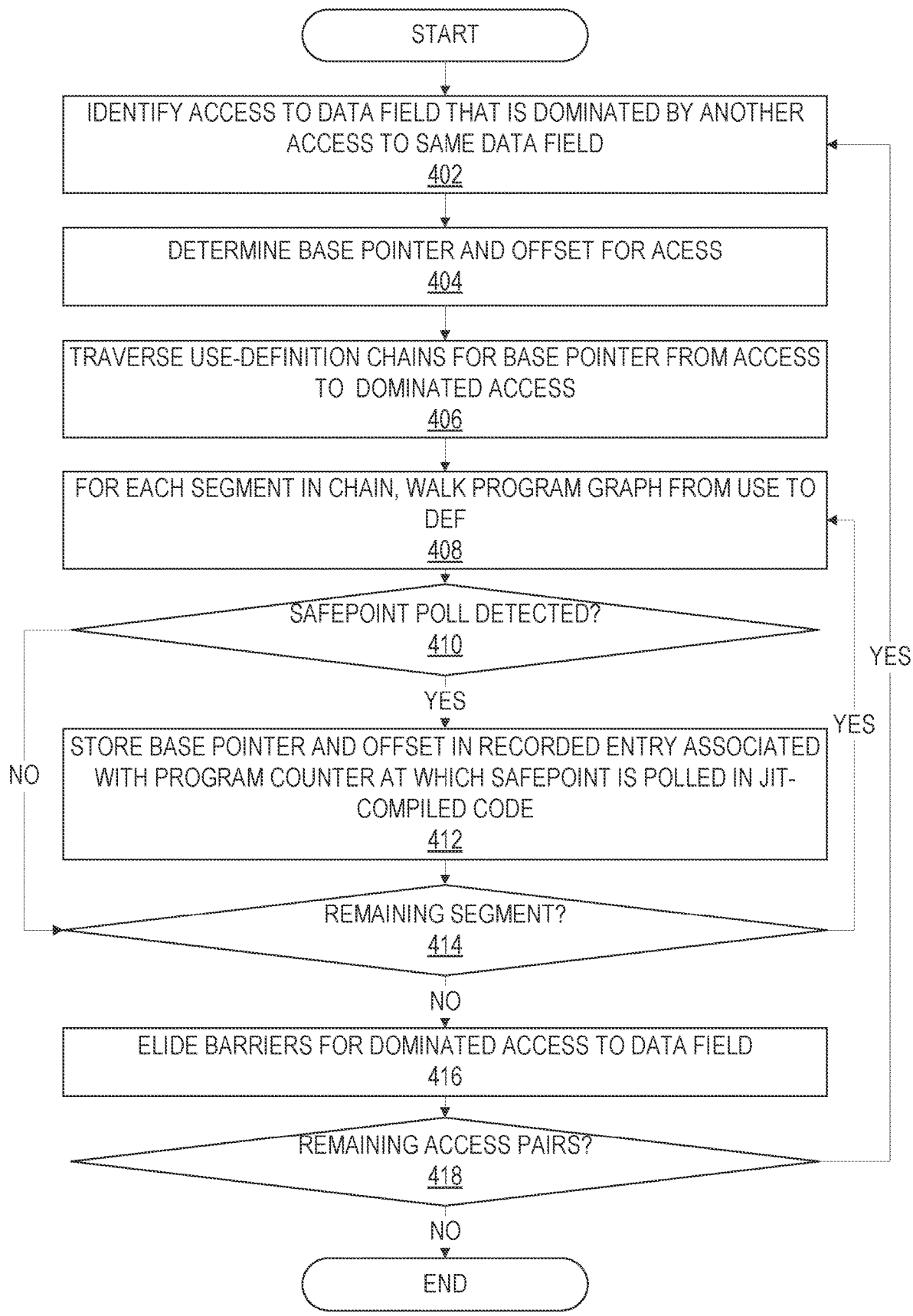
FIG. 4 illustrates an example set of operations for identifying and recording safepoint-attached data according to some embodiments.

FIG. 4 illustrates an example set of operations for identifying and recording safepoint-attached data according to some embodiments. One or more operations illustrated in FIG. 4 may be modified, rearranged, or omitted all together. Accordingly, the particular sequence of operations illustrated in FIG. 4 should not be construed as limiting the scope of one or more embodiments.

Referring to FIG. 4, the process identifies an access to a data field that is dominated by a previous access to the same data field (operation 402). An access is dominated by another access if all control paths that include the dominated access also include the previous access to the same data field. An access that dominates a subsequent access may also be dominated by a previous access to the same data field. For example, an access within a loop may dominate an access in a subsequent iteration of the loop and be dominated by an access in a previous iteration of the loop. The process may identify the access by scanning a data structure, such as a work list, that includes metadata about each access, including a unique identifier for the data field. The metadata may be added to the worklist during program runtime. In other embodiments, the process may scan the instruction set directly to identify access pairs.

Responsive to identifying an access pair, the process determines the base pointer and offset for the data field based on the traversal (operation 404). In some embodiments, the base pointer is identified in a late-stage intermediate representation instruction associated with the dominant access. The offset for the access may be a known constant. However, in other cases, the offset may be extracted from the use-definition chains or through other metadata structures associated with the data field. The full object pointer, comprising the base and offset, identifies the memory address of the object within the heap at the time a safepoint poll, is executed.

Once the base pointer and offset have been identified, the process traverses the use-definition chains for the base pointer from the access to the dominated access (operation 406). In some embodiments, the process identifies the use-definition chains from an object reference map associated with the execution state of the program. An object reference map is a data structure that stores a set of use-define chains. Each use-define chain may correspond to a data structure that stores metadata tracking the use of a data field and all the associated definitions for the data field through which the use may be reached without any intervening definitions. Additionally or alternatively, the data structures may include metadata that tracks changes to values and pointers associated with the data field. For example, the use-define chain for a data field may track when a base pointer to the data field changes registers or is spilled to the stack. By walking through the use-definition chains, the process may determine what changes were made to the pointers associated with a data field, if any. A live object pointer, corresponding to the base pointer, may be identified within the chain by back-tracking through all changes made prior to the dominated access back to the safepoint poll.

The process next walks a program graph from the use to the definition for a selected program segment (operation 408). A program graph may define data dependencies and control dependencies between a use of the data field and the definition of the data field. The program graph may include several different segments corresponding to different program paths through the defined dependency chains.

As the process walks the program graph from use to def, the process detects whether a safepoint poll exists between the dominant access and the subsequent access (operation 410). Safepoint polls may be added by JIT compiler 109 during runtime. To detect such safepoint polls, the process may analyze a late-stage intermediate representation of the program code. The process may scan the instructions between the dominant and dominated access in the control flow path to determine whether a safepoint poll instruction has been inserted into the program code.

In some embodiments, the process stores the base pointer and offset in a recorded entry associated with a program counter at which the safe point is polled in the JIT-compiled code (operation 412). As noted above, a program counter provides an index to an instruction. The program counter for the safepoint poll may further serve as an index to the base pointer and offset, which may be stored in a side table or other data structure associated with the instruction. As a result, the recorded information is linked or "attached" to the safepoint poll instruction. The recorded information may be used to execute safepoint-attached barriers as described further below.

The process may further walk the program graph for other segments if any remain (operation 414). For example, the process may iterate through a plurality of paths from the use to the definition within the late-stage intermediate representation of the program code.

The process further elides GC barriers for the dominated access to the data field (operation 416). In cases where an intermediary safepoint poll exists, the process may elide the GC barrier once the corresponding metadata is recorded and linked to the safepoint poll instruction. If a safepoint poll does not exist between the two accesses, then the barrier may be elided without recording the base pointer and offset data.

The process may further repeat the analysis on other access pairs if any remain (operation 418). For example, the process may iterate through a work list of access pairs within the JIT-compiled program code or continue to scan the code for additional access pairs.

In some embodiments, JIT compiler 109 elides GC barriers by refraining from injecting store or load barriers into the JIT-compiled code for the dominated access. In other embodiments, JIT compiler 109 may remove GC barriers, including load or store barriers, if previously injected into the code to prevent execution of the barriers. JIT-compiler 109 may perform the above steps of the analysis during program runtime, such as on a late-stage intermediate representation of the program code once all safepoint polls for the target program code, if any, have been inserted. The barrier elision may optimize code segments, especially in loop executions. For example, a loop may include thousands of accesses to the same object field with zero or relatively few safepoint executions. In such a scenario, eliding the barrier may avoid the costs associated with executing thousands of GC barriers.

4. Safepoint-Attached Barriers

Safepoint point polls typically do not result in execution of a safepoint operation. However, in the event that a safepoint has been requested, a risk arises that GC invariants may be violated if no GC barriers are executed. To maintain GC invariants, the recorded information may be used by GC processes to lazily and incrementally apply safepoint-attached barriers. The safepoint-attached barriers maintain GC invariants without requiring GC barriers to be injected into the JIT-compiled program code.

Figure 5:
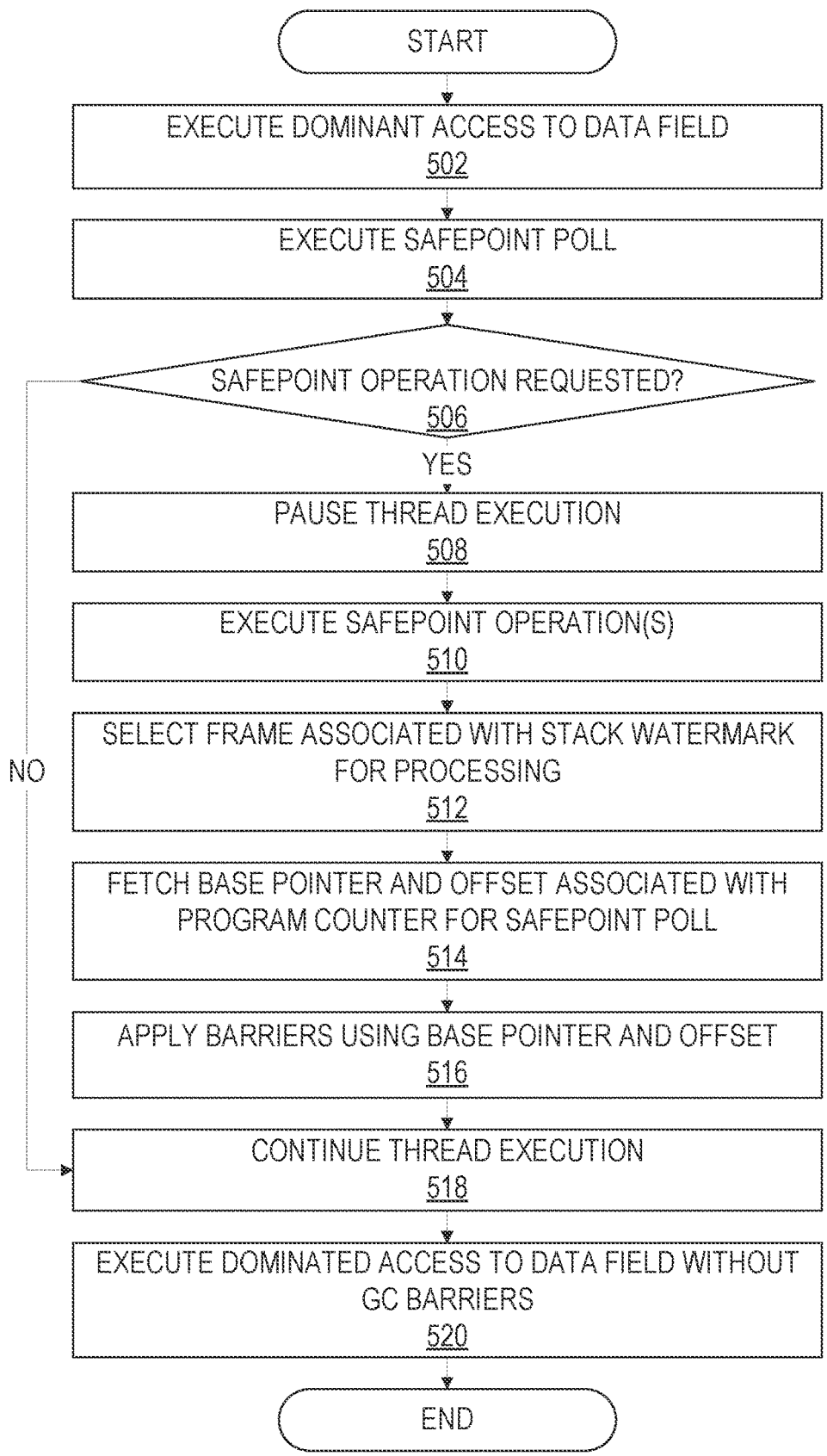
FIG. 5 illustrates an example set of operations for implementing safepoint-attached barriers according to some embodiments.

FIG. 5 illustrates an example set of operations for implementing safepoint-attached barriers according to some embodiments. One or more operations illustrated in FIG. 5 may be modified, rearranged, or omitted all together. Accordingly, the particular sequence of operations illustrated in FIG. 5 should not be construed as limiting the scope of one or more embodiments.

Referring to FIG. 5, a mutator thread executes a dominant access to a data field (operation 502). For example, the mutator thread may execute a load or store operation to read or write values assigned to the data field. In some embodiments, the mutator thread may execute a GC barrier during the load or store operation. However, in other embodiments, a GC barrier may be elided, such as when the dominant access is dominated by another access to the same field.

After executing the dominant access, the mutator thread may continue executing program code until a safepoint poll is reached. The mutator thread may then execute the safepoint poll to check whether execution of a safepoint operation has been requested and whether to pause execution of the thread (operation 504).

Responsive to executing the safepoint poll, the mutator thread determines whether a safepoint operation has been requested (operation 506). For example, the mutator thread may check to determine whether a safepoint flag has been set or not. Based on the value of the flag, the mutator thread may determine whether another process has requested a safepoint.

If a safepoint operation has been requested, then execution of the program code by the mutator thread is paused (operation 508). As previously noted, with concurrent thread processing, implementation of a safepoint may involve stopping multiple parallel threads of execution for a program. In other cases, only a single thread or subset of mutator threads may be paused during execution of a safepoint. The mutator thread may be a virtual thread, and a continuation stack reifying the program control state of the thread may be yielded to suspend execution of the thread.

Once the thread has been paused, one or more other threads execute one or more safepoint operations (operation 510). A safepoint operation may include execution of one or more GC operations, such as root processing and/or a time-bounded marking termination operation, which may be operations that are part of a full garbage collection phase. Additionally or alternatively, one or more GC operations that scale with the size of the heap and metadata may be executed outside of the safepoint operations and in concurrent phases. For example, one or more GC processes may concurrently mark objects based on whether the objects are known to be reachable or not, relocate objects from one area on the heap to another, process references to maintain consistency, update a remembered set that identifies pointers into one generation from an older generation, unload classes, execute root processing operations, and reclaim memory space from the heap for objects that are no longer live. As objects are relocated and space is reclaimed, the GC processes may update object pointers to reflect new memory addresses within the heap.

In some embodiments, a GC safepoint operation logically invalidates thread stacks by setting a global flag associated with the thread stacks. A set of concurrent processes may process the invalidated stack and track which frames remain to be processed. When a stack wakes up from a safepoint, the thread may check the global flag to determine whether the thread stacks are invalidated. The thread may install a stack watermark to track the state of its own stack scan by the concurrent GC processes. The stack watermark allows the thread to determine whether a processed frame is above the watermark. With downward-growing stacks, the thread may infer that frames above the watermark should not be used since the frame may include stale object references.

In some embodiments, to optimize processing, a stack watermark barrier may be executed to address frames that are above the current stack watermark. When above the watermark, the stack watermark barrier may execute a slow path to fix frames by updating the object references within in it and moving the watermark upward. A safepoint poll may take the slow path when safepoint operations are pending for the frame and/or when returning to a frame that has not yet had the object references fixed.

In some embodiments, when the stack watermark is invoked to process a frame for the garbage collector, the GC process also executes a safepoint-attached barrier to fix object references to accommodate subsequent, dominated accesses in the control flow path. Specifically, the process selects a frame associated with a stack watermark for processing (operation 512). The selection may be performed by the newly wakened thread or a concurrently executing GC process.

When a frame is selected for processing, the process may check the frame metadata to determine whether the program counter for the safepoint poll instruction, if it exists in the selected frame, has recorded information identifying the base pointer for the dominant access. If there is no dominant access associated with the safepoint poll instruction, then the process may continue processing the frame without executing a safepoint-attached barrier. However, if recorded information is detected, then the process fetches the recorded base pointer and offset associated with the program counter for the safepoint poll (operation 514).

The process uses the recorded pointer information attached to the safepoint poll instruction to apply GC barriers (operation 516). Executing the barriers may compare the in-memory pointers for the data field with the recorded pointer information. If the pointers do not match, then the GC barriers may fix the pointers in memory in a self-healing operation. Executing the barriers prevents the subsequent, dominated access from using stale pointers.

After the safepoint-attached barrier has been applied, the mutator thread resumes execution of the program code (operation 518). For example, the mutator thread may mount the continuation and continue executing the JIT-compiled method code.

The mutator thread may then execute the dominated access to the data field without applying a GC barrier (operation 520). When a safepoint operation is executed, the mutator thread may rely on the previously executed safepoint-attached barrier to correct the object references and prevent the dominated access from violating any GC invariants. The lazy and incremental approach to applying the barrier allows JIT-compiler 109 to elide barriers in the JIT-compiled code. When safepoint polls are not executed, then thread execution may continue without executing the safepoint-attached barrier. In both scenarios, the mutator thread may elide the GC barriers for the dominated access.

The process depicted in FIG. 5 may be executed several times during loop processing. During runtime, JIT-compiler 109 does not need to insert any GC barriers into the JIT-compiled code for the loop. Thus, the loop may iterate several times without executing any GC barriers for the dominated accesses. If a safepoint operation is requested, which is typically infrequent relative to the total number of loop executions, then the safepoint-attached barrier may be executed during concurrent stack frame processing before the thread resumes, thereby maintaining GC invariants.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
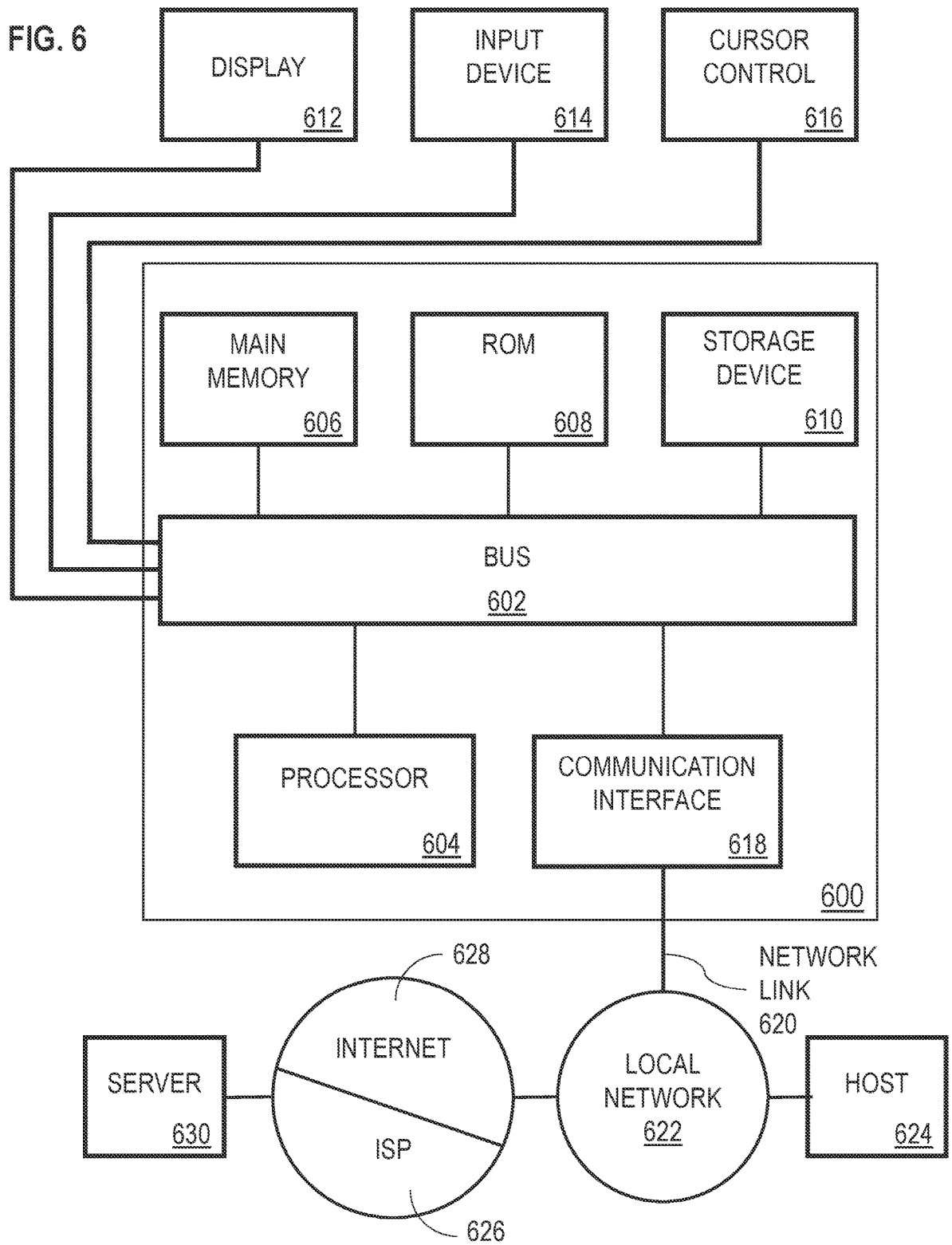
FIG. 6 shows a block diagram that illustrates a computer system in accordance with one or more embodiments.

For example, FIG. 6 is a block diagram that illustrates computer system 600 upon which an embodiment of the invention may be implemented. Computer system 600 includes bus 602 or other communication mechanism for communicating information, and a hardware processor 604 coupled with bus 602 for processing information. Hardware processor 604 may be, for example, a general-purpose microprocessor.

Computer system 600 also includes main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes read only memory (ROM) 608 or other static storage device coupled to bus 602 for storing static information and instructions for processor 604. Storage device 610, such as a magnetic disk or optical disk, is provided and coupled to bus 602 for storing information and instructions.

Computer system 600 may be coupled via bus 602 to display 612, such as a cathode ray tube (CRT) or light emitting diode (LED) monitor, for displaying information to a computer user. Input device 614, which may include alphanumeric and other keys, is coupled to bus 602 for communicating information and command selections to processor 604. Another type of user input device is cursor control 616, such as a mouse, a trackball, touchscreen, or cursor direction keys for communicating direction information and command selections to processor 604 and for controlling cursor movement on display 612. Input device 614 typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a network line, such as a telephone line, a fiber optic cable, or a coaxial cable, using a modem. A modem local to computer system 600 can receive the data on the network line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
identifying an instruction that checks whether to pause a thread between executing a first access to a data field and a second access to the data field, wherein the second access to the data field is subsequent to and dominated by the first access to the data field within at least one control flow path;
responsive to identifying the instruction that checks whether to pause the thread between the first access to the data field and the second access to the data field, recording data that associates a pointer for the data field with the instruction that checks whether to pause the thread between the first access to the data field and the second access to the data field;
pausing execution of the thread between the first access to the data field and the second access to the data field;
performing at least one garbage collection operation while the thread of execution between the first access to the data field and the second access to the data field is paused, wherein the pointer for the data field is identified based on the data that associates the pointer for the data field with the instruction that checks whether to pause the thread between the first access to the data field and the second access to the data field;
updating at least one value associated with the data field in memory based at least in part on the pointer for the data field such that the second access that is subsequent to and dominated by the first access to the data field can elide garbage collection barriers; and
after updating the at least one value associated with the data field in memory based at least in part on the pointer for the data field, resuming execution of the thread, wherein the thread executes the second access to the data field without a store barrier or a load barrier.

2. The method of claim 1, wherein recording the pointer for the data field comprises mapping a program counter for the instruction to a base pointer and an offset for the data field.

3. The method of claim 1, further comprising: identifying the pointer by traversing a set of use-define chains from the second access to the instruction for checking whether to pause the thread; and determining a base pointer and offset for the field based at least in part on a store operation or a write operation in the set of use-define chains.

4. The method of claim 1, further comprising: executing the instruction to check whether to pause the thread between executing the first access to a data field and the second access to the data field; determining to proceed without pausing the thread; wherein the thread executes the second access to the data field without a store barrier or a load barrier and without updating the at least one value associated with the data field in memory.

5. The method of claim 1, wherein checking whether to pause the thread comprises determining whether a garbage collection process has requested a safepoint.

6. The method of claim 1, wherein updating at least one value associated with the data field in memory based at least in part on the pointer for the data field comprises:
identifying a program counter associated with the instruction in a stack frame during a scanning operation of a stack; and identifying a base pointer and offset associated with the data field that is mapped to the program counter; and restoring a reference that was changed by said at least one garbage collection operation using the base pointer and the offset.

7. The method of claim 1, wherein updating at least one value associated with the data field in memory based at least in part on the pointer for the data field is performed by a garbage collection process.

8. One or more non-transitory computer-readable media storing instructions which, when executed by one or more hardware processors, cause:
identifying an instruction that checks whether to pause a thread between executing a first access to a data field and a second access to the data field, wherein the second access to the data field is subsequent to and dominated by the first access to the data field within at least one control flow path;
responsive to identifying the instruction that checks whether to pause the thread between the first access to the data field and the second access to the data field, recording data that associates a pointer for the data field with the instruction that checks whether to pause the thread between the first access to the data field and the second access to the data field;
pausing execution of the thread between the first access to the data field and the second access to the data field;
performing at least one garbage collection operation while the thread of execution between the first access to the data field and the second access to the data field is paused, wherein the pointer for the data field is identified based on the data that associates the pointer for the data field with the instruction that checks whether to pause the thread between the first access to the data field and the second access to the data field;
updating at least one value associated with the data field in memory based at least in part on the pointer for the data field such that the second access that is subsequent to and dominated by the first access to the data field can elide garbage collection barriers; and
after updating the at least one value associated with the data field in memory based at least in part on the pointer for the data field, resuming execution of the thread, wherein the thread executes the second access to the data field without a store barrier or a load barrier.

9. The media of claim 8, wherein recording the pointer for the data field comprises mapping a program counter for the instruction to a base pointer and an offset for the data field.

10. The media of claim 8, wherein the instructions further cause: identifying the pointer by traversing a set of use-define chains from the second access to the instruction for checking whether to pause the thread; and determining a base pointer and offset for the field based at least in part on a store operation or a write operation in the set of use-define chains.

11. The media of claim 8, wherein the instructions further cause: executing the instruction to check whether to pause the thread between executing the first access to a data field and the second access to the data field; determining to proceed without pausing the thread; wherein the thread executes the second access to the data field without a store barrier or a load barrier and without updating the at least one value associated with the data field in memory.

12. The media of claim 8, wherein checking whether to pause the thread comprises determining whether a garbage collection process has requested a safepoint.

13. The media of claim 8, wherein updating at least one value associated with the data field in memory based at least in part on the pointer for the data field comprises: identifying a program counter associated with the instruction in a stack frame during a scanning operation of a stack; and identifying a base pointer and offset associated with the data field that is mapped to the program counter; and restoring a reference that was changed by said at least one garbage collection operation using the base pointer and the offset.

14. The media of claim 8, wherein updating at least one value associated with the data field in memory based at least in part on the pointer for the data field is performed by a garbage collection process.

15. A system comprising:
one or more hardware processors;
one or more non-transitory computer-readable media storing instructions which, when executed by the one or more hardware processors, cause:
identifying an instruction that checks whether to pause a thread between executing a first access to a data field and a second access to the data field, wherein the second access to the data field is subsequent to and dominated by the first access to the data field within at least one control flow path;
responsive to identifying the instruction that checks whether to pause the thread between the first access to the data field and the second access to the data field, recording data that associates a pointer for the data field with the instruction that checks whether to pause the thread between the first access to the data field and the second access to the data field;
pausing execution of the thread between the first access to the data field and the second access to the data field;
performing at least one garbage collection operation while the thread of execution between the first access to the data field and the second access to the data field is paused, wherein the pointer for the data field is identified based on the data that associates the pointer for the data field with the instruction that checks whether to pause the thread between the first access to the data field and the second access to the data field;
updating at least one value associated with the data field in memory based at least in part on the pointer for the data field such that the second access that is subsequent to and dominated by the first access to the data field can elide garbage collection barriers; and
after updating the at least one value associated with the data field in memory based at least in part on the pointer for the data field, resuming execution of the thread, wherein the thread executes the second access to the data field without a store barrier or a load barrier.

16. The system of claim 15, wherein recording the pointer for the data field comprises mapping a program counter for the instruction to a base pointer and an offset for the data field.

17. The system of claim 15, wherein the instructions further cause:
identifying the pointer by traversing a set of use-define chains from the second access to the instruction for checking whether to pause the thread; and determining a base pointer and offset for the field based at least in part on a store operation or a write operation in the set of use-define chains.

18. The system of claim 15, wherein the instructions further cause: executing the instruction to check whether to pause the thread between executing the first access to a data field and the second access to the data field; determining to proceed without pausing the thread; wherein the thread executes the second access to the data field without a store barrier or a load barrier and without updating the at least one value associated with the data field in memory.

19. The system of claim 15, wherein checking whether to pause the thread comprises determining whether a garbage collection process has requested a safepoint.

20. The system of claim 15, wherein updating at least one value associated with the data field in memory based at least in part on the pointer for the data field comprises: identifying a program counter associated with the instruction in a stack frame during a scanning operation of a stack; and identifying a base pointer and offset associated with the data field that is mapped to the program counter; and restoring a reference that was changed by said at least one garbage collection operation using the base pointer and the offset.

\* \* \* \* \*